(No Model.)

E. B. IVES.
RAILWAY SIGNAL CIRCUIT BREAKER.

No. 386,541. Patented July 24, 1888.

WITNESSES.
A. S. Fitch,

INVENTOR.
Edward B. Ives,
By his Attorney.

N. PETERS, Photo-Lithographer, Washington, D. C.

UNITED STATES PATENT OFFICE.

EDWARD B. IVES, OF NEW YORK, N. Y.

RAILWAY-SIGNAL-CIRCUIT BREAKER.

SPECIFICATION forming part of Letters Patent No. 386,541, dated July 24, 1888.

Application filed November 12, 1885. Renewed October 24, 1887. Serial No. 253,234. (No model.)

*To all whom it may concern:*

Be it known that I, EDWARD B. IVES, of the city of New York, in the county and State of New York, and a citizen of the United States of America, have invented a new and useful Improvement in Circuit Breakers and Closers or Key-Blocks, of which the following is a specification, reference being had to the accompanying drawings, forming part of the same, in which—

Figure 10:
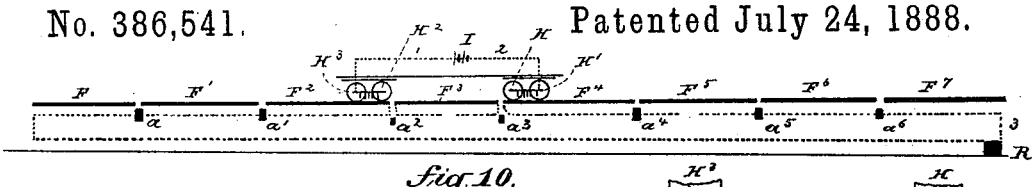
Figure 11:
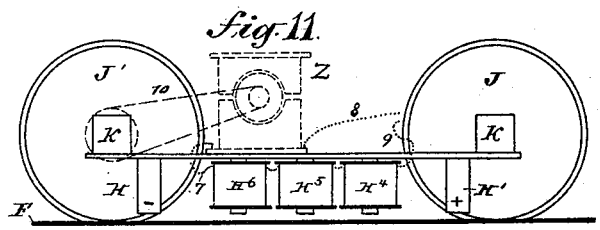
Figures 4, 5:
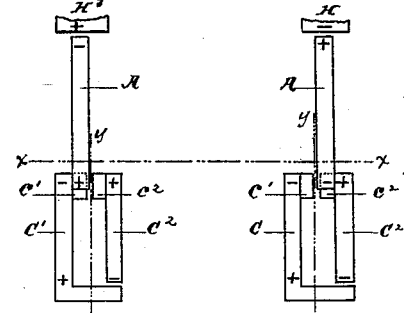
Figure 12:
Figures 1, 2, 3:
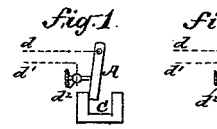
Figure 6:
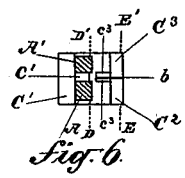
Figure 7:
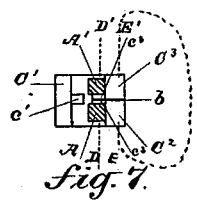
Figure 13:
Figure 14:
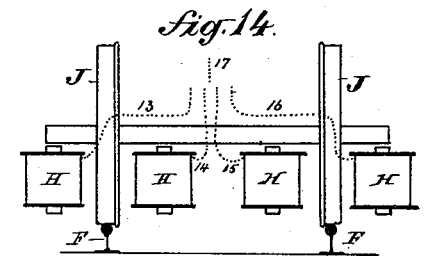
Figure 8:
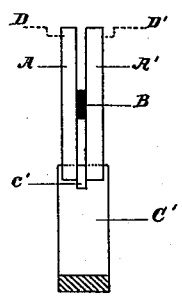
Figure 9:
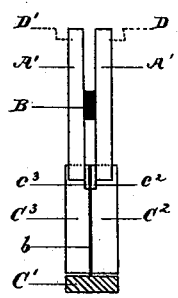
Figure 15:
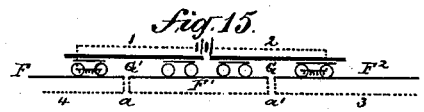

Figure 1 is a side elevation of the simplest form of my device with the circuit closed; Fig. 2, a similar view with the circuit open; Fig. 3, a view of one connected with two circuits, one of which is closed and another open. Fig. 4 represents another form of this device with the circuit closed; Fig. 5, a view of the same, in which the direct circuit has been broken and another partial circuit spliced in. Fig. 6 is a cross-section of Fig. 4 on line $xx$. Fig. 7 is a cross-section of Fig. 5 on line $xx$. Fig. 8 is a vertical section of Fig. 4 on line $yy$. Fig. 9 is a vertical section of Fig. 5, on line $yy$. Fig. 10 is a side elevation of a system of railroad-telegraphy employing my said key-block. Fig. 11 is a side elevation of the truck of a car used in said system and carrying the magnets used to actuate said key-blocks. Fig. 12 illustrates the manner of using said key-blocks to shunt two circuits through instruments on a car on the railroad. Fig. 13 shows it in connection with four different circuits. Fig. 14 is an end elevation of a modified form and arrangement of exciting-magnets, and Fig. 15 shows the arrangement of connections when the rails of the road are longer than the distance between the trucks of the cars.

It is well-known that the near proximity of the pole of a powerful magnet to a piece of soft iron will cause said soft iron to become magnetized. Thus, if such a piece of soft iron be pivoted between its ends, or at one end, and the other left free near the poles of a magnet it will partake of the polarity of said magnet, and its end nearest one pole of said magnet will be of a polarity opposite to that of said pole, while its opposite end will be of similar polarity. Now the passing of a powerful magnet near the latter end will cause (if the proximate pole is the same as that to which it is brought near) a change of polarity in said soft iron, and thereupon its free end will be repelled by the pole of the fixed magnet which formerly attracted it, and it is this principle which I have made use of in my present invention.

As I devised and employ this invention in connection with other apparatus, I will first describe it in the form best adapted for that use—that is, as a key-block to break existing circuit-connections and shunt in partial circuits and again cut them out and restore the original circuit.

A A', Figs. 4 and 6, are two pieces of soft iron pivoted preferably near their upper ends and preferably secured together, though insulated from each other, as seen in Figs. 8 and 9, by a piece of suitable material, B.

C is a permanent horseshoe-magnet, made in three pieces, C' C² C³, and placed, as shown, so that the south pole of magnet C' and the two north poles of magnets C² C³, placed side by side, shall embrace the lower ends of the pole-pieces A A', but not so closely but that they may move freely back and forth between said poles. Attached to the south pole of magnet C' is a small piece of metal, $c'$, and two small pieces, $c^2$ $c^3$, insulated from each other by suitable material, $b$, are attached to the respective north poles of C² and C³, said small pieces being of such size, shape, and position that when A and A' are attracted to C', $c'$ will lie between and make contact with both A and A', and when they are attracted to C² C³, $c^2$ and $c^3$ will lie between and make contact, respectively, with A and A', and that $c'$ will remain in contact with A and A' until after they, when swung away from C', make contact with $c^2$ and $c^3$. Wires of the circuit D D' are attached one to A and the other to A', and the ends of the shunt-circuit E E' are attached, respectively, to C² and C³.

When the key-block is in the position shown in Fig. 4, it is obvious that the circuit is closed directly through the apparatus, it being wire D, pole-piece A, contact $c'$, pole-piece A', and wire D'; but if now the south pole of a powerful magnet be brought near the upper ends of A A' their polarity will be changed, the lower ends will become south poles and will be repelled by C' and attracted by C² and C³, causing A and A' to swing on their pivots, make contact, respectively, with $c^2$ and $c^3$, and then break it with $c'$, thus breaking the direct circuit from D to D', as stated, and shunting it through E E' and whatever instruments may be in the circuit connecting them, the course then being wire D, pole-piece A, contact $c^2$, magnet C², wire E, its circuit-wire E', magnet C³, piece $c^3$, pole-piece A', and wire D', thus rendering it possible to switch into the circuit from D to D' any partial circuit E E' that may be desired.

It is evident that for the purpose of merely making or breaking a circuit many of the parts herein described might be dispensed with, they being desirable only in an instrument designed for the special use mentioned, and that one entirely operative might consist of but one pole-piece A, a single magnet, C', having its poles so placed as to embrace and yet afford movement to A and two wires of a circuit, $d$ $d'$, one connected to pole-piece A and the other to a post, $d^2$, as shown in Figs. 1 and 2, or both connected to contact-posts, as shown at $d^2$ $d^3$ in Fig. 3. Then when the pole-piece was in the position shown in Fig. 1 the circuit would be from $d$ to A and thence to $d'$, and when by the proximity of the south pole of a powerful magnet to the upper end of A its polarity is changed its lower end would merely, by the before-named attraction and repulsion, be swung away from the south pole and toward the north pole of C, breaking the circuit from $d$ to $d'$, as seen in Figs. 1 and 2, and, if desired, establishing one from $e$ to $e'$, as seen in Fig. 3, which represents the connecting-wires $e$ $e'$ of another circuit attached to posts $e^2$ $e^3$.

My key-block is shown and described as being so arranged that the pole piece or pieces make direct contact with the magnets, and it is thus that I prefer to construct them, as there is a peculiar attraction and holding of the pole-piece thus arranged which prevents its displacement by jar or other mechanical disturbance other than a change of polarity, which is of great advantage, but which in no way interferes with its prompt and rapid movement by the change of polarity described. I do not, however, intend to limit my claims for the employment of my key-block in a system of railroad-telegraphy to one in which such contact takes place, as by arranging posts—such as shown in Fig. 3—in such position that the pole-piece will make contact with and be stopped by them when almost but not quite in contact with the stationary magnet a very serviceable key-block may be constructed. I use the key-block, however, and show it in connection with a system of telegraphing in which an electric current is shunted through a partial circuit and instruments therein placed on a railroad-car, preferably using the rails as a part of the circuit, and the described key-blocks are employed to insure a break in the rail-circuit between the front and rear track contacts of the car-circuits, that the current may be forced to traverse the circuit on the car, and that off the car other than directly along the rails instead of short-circuiting through said rails. To conveniently accomplish this, I divide the railroad into blocks or sections, each section being provided with a local circuit running through a repeater, which is also placed in a main-line circuit passing along the line from station to station in the usual way. The use of the local circuits is a separate invention, which enables me to use low-tension currents, and thus more easily provide sufficient insulation and avoid grounding.

The rails of the road are insulated from each other at each joint, and are preferably shorter than the distance between the rail-contacts of the telegraph-car. This may be secured by extending the train-circuit over two or more cars, as shown in Fig. 15, or for such a distance as will insure there being a rail-joint at all times between the points where the train-circuit makes contact with the rails. At each rail-joint is placed one of the described key-blocks, the wires D D' being a part of the aforesaid local circuit, and wires E and E' being respectively connected to the contiguous ends of the rail of the tracks F² F³ and F³ F⁴, &c., as shown at key-blocks $a^2$ $a^3$, Fig. 1. On this track is a telegraph-car, G, equipped with telegraph-instruments and a battery, with wires 1 and 2 running therefrom to track-contacts (in this case the wheels) at the front and rear of the car. Powerful magnets H H³ are also placed at the front and rear of the car (preferably secured to the trucks) in such position that they will pass over and in close proximity to the soft iron A A' of the key-blocks when the car runs over the road, the one on the front truck having its south pole down and the one on the rear its north pole down. Now when the car thus equipped enters the system arranged as described, and shown in Fig. 1, its operation is as follows: Magnet H passes over key-block $a$, and in the before-described manner causes it to operate, breaking the direct local circuit through it and connecting one end of said circuit through E to rail F and the other through E' to rail F', and when the magnet H³ passes said key-block it breaks said rail-connection and re-establishes the direct circuit through the block alone from D to D'. In the view given this is supposed to have occurred at $a$ and $a'$ and the first action merely at $a^2$ and $a^3$, the first two being now closed and the last two yet remaining open.

It is evident from the foregoing that a complete circuit will at all times exist between the partial circuit on the car and the local circuit on the ground, it being at present battery I, wire 1, wheel J, rail F⁴, key-blocks $a^2$ $a^4$ $a^5$ $a^6$, wire 3, repeater R, wire 4, key-blocks $a$ $a'$ $a^2$, rail $F^2$, wheel $J^3$, wire 1 to battery I, and that if an electrical impulse be produced in said circuit it will pass through said repeater, when by proper devices it may be communicated to the main line, and vice versa, and by means of such impulses electric signals may be produced at the fixed station or on the car. As the car proceeds it will close key-block $a^2$, and the circuit will then be through rails $F^3$ and $F^4$ to and from the car, and so on, causing a circuit from the car-battery to exist through repeater R as long as the car remains on any rails of this section.

I prefer to use two magnets on the front truck and two on the rear—H' first with its north pole down, H with its south pole down, $H^2$ with its south pole down, and $H^3$ with its north pole down—that no failure may take place if the car should run just far enough to open a block and then stop and back. These magnets may be parts of the car-trucks—for instance, the axles—or they may be electro-magnets, as shown in Fig. 11, excited by a dynamo, Z, driven by power from one of the axles K, and so connected to the magnets that the lower poles of the front magnets will be south and those of the rear ones north, with the special advantage that an increase in the speed of the train, which decreases the time within which the magnet must act, increases also the speed of the dynamo and furnishes increased power to cause such action.

By insulating the telegraph-car wheels and those of the car next to it front and rear a second circuit might be carried through the car on the other side, a complete system of key-blocks, local circuits, and main line being arranged for that purpose, as shown in Fig. 12.

If the train is long enough to permit the use of two telegraph-cars at least two rail-lengths apart, such second circuit could be arranged on either side, placing the respective key-blocks and magnets in such relative positions that the appropriate magnets shall operate each its own key-blocks. This can be secured by so arranging the exciting-magnet that it is capable of lateral adjustment, in which event any reasonable number of circuits may one at a time be brought into operative connection by shifting the exciting-magnet to a position in which it will cause the key-block of the proper circuit to operate. The circuits in such event may be arranged as shown in Fig. 13. When electro-magnets are employed, this end is secured by connecting them with the dynamo by a switch under the control of the operator, so arranged that he may at pleasure charge the magnet placed to operate the particular circuit he desires to cut in.

What I claim as my invention, and desire to secure by Letters Patent, is—

1. A key-block composed of a horseshoe-magnet, a piece of soft iron so pivoted as to swing one of its ends between the poles of said magnet, and to make contact with one or the other thereof as it may be swung in one or the other direction, and adapted to have its position changed by the passage near its end of the pole of a powerful magnet of similar polarity to that of the pole of the horseshoe-magnet with which the free end of said pole-piece is at that time in contact, a circuit-wire attached to said pole-piece, a contact-post, the other circuit-wire attached to said contact-post, which is so located that when said pole-piece is swung in one direction it makes contact therewith, and when swung in the other direction it breaks contact therewith, all constructed, arranged, and combined substantially as and for the purpose set forth.

2. The combination of magnet C, pole-piece A, pivoted as described, contact-posts $d^2\ d^3\ e^2\ e^3$, arranged as described, whereby said pole-piece will make contact with one pair of them and the magnet, in whichever direction it is swung, and wires $d\ d'\ e\ e'$, all as and for the purpose described.

3. A circuit-breaker composed of three magnets, $C'\ C^2\ C^3$, two pole-pieces, A A', insulated from each other and pivoted to swing between the opposite poles of said magnets, as described, wires D D', connected to said pole-pieces, respectively, the block $c'$, connected to C' and arranged to pass between and make contact with said pole-pieces when they are swung in one direction, and the blocks $c^2\ c^3$, insulated from each other and connected, respectively, to magnets $C^2$ and $C^3$ in such position that they will pass between and make contact with A and A' when swung away from C', and of such a width that such contact will be made before contact with $c'$ is broken and the wires E E' connected with $C^2$ and $C^3$, respectively, all combined as and for the purpose specified.

4. The combination, with a telegraph circuit-wire, of the described key-block connected therewith, a partial circuit-wire upon a telegraph-car, and magnets also upon said car, and arranged to pass opposite poles in close proximity to said key-block, whereby the telegraph-circuit will be broken and shunted through said car, as and for the purpose specified.

5. In a railway-telegraph system, two or more circuit-wires running along the railway-track and provided with key-blocks, as described, a partial telegraph-circuit upon a car upon said road, and a magnet upon said car provided with means for causing said magnet to operate the key-blocks of any one of said circuits, as and for the purpose specified.

6. The combination, with a telegraph-circuit, of the described key-block in proximity to the rails of a railway, and magnets, arranged, as described, upon a car upon said rails, whereby the passage of said car over said rails will bring the magnets of opposite polarity upon said car in position to break or close the circuit with which said key-blocks are connected, as specified.

7. The combination, with a telegraph circuit-wire, of a key-block adapted to be operated to make and break said circuit by the passage near it of magnets of opposite polarity and located in close proximity to the rails of a railway, together with magnets of opposite polarity upon a car upon said rails, arranged as described, whereby the passage of said car over said rails will bring said magnets of opposite polarity in position to successively break and close the circuit with which said key-blocks are connected, for the purpose specified.

EDWARD B. IVES.

Witnesses:
T. W. HEARD,
LILLIE D. YOUNG.